Patented July 17, 1928.

1,677,640

UNITED STATES PATENT OFFICE.

FERDINAND KELLER, OF OFFENBACH-ON-THE-MAIN-BURGEL, AND KARL SCHNITZ-SPAHN, OF OFFENBACH-ON-THE-MAIN, GERMANY, ASSIGNORS TO GRASSELLI DYE-STUFF CORPORATION, OF NEW YORK, N. Y., A CORPORATION OF DELAWARE.

SOLID DIAZOSALT.

No Drawing. Application filed February 11, 1927, Serial No. 167,580, and in Germany February 12, 1926.

This invention relates to new solid diazosalts of the general formula:

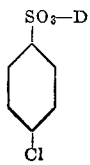

wherein D represents the diazonium radicle of a substituted unsulfonated amine of the benzene series, containing at least one negative substituent, other than a sulfonic group, which may be obtained by double decomposition reaction of mineral acid diazosalt solutions of such amines obtained in the customary manner and sufficiently concentrated either with a para-chlorobenzene sulfonic metal salt or with free para-chlorobenzene sulfonic acid. The new salts separate from their solutions as crystalline whitish to yellowish colored precipitates and can be easily filtered and dried.

Compared with other arylsulfonates and arylpolysulfonates of the benzene and naphthalene series the present new solid diazosalts are distinguished by the capability of being readily separated and a good stability and the clearness of the shades they produce.

As bases suitable for forming solid diazosalts of the aforesaid formula the nitranilines, chloronitranilines, dichloroanilines, chloro- and nitrotoluidines and nitroaminophenolalkylethers may be named.

The new solid diazosalts are valuable diazosalt preparations for dyeing and printing. Under certain conditions it has been found advisable to add to the diazonium salt preparations such substances as are useful in dyeing processes.

The following examples are given to illustrate the invention, the parts being by weight:

Example 1.

A diazo solution, obtained from 138 parts of para-nitraniline, 500 parts of hydrochloric acid of 20% and 71 parts of sodium nitrite, is mixed with 710 parts of a solution, containing 30% of free parachlorobenzene sulfonic acid (molecular weight: 192,5). When the decomposition is finished, the separated diazosalt is filtered and dried in a suitable manner. It is an almost colorless and well soluble powder and has probably the formula:

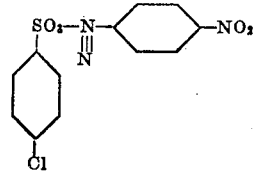

Example 2.

A diazosolution, prepared from 252 parts of 5-nitro-2-amino-1-phenolmethylether, 263 parts of a solution of sodium nitrite of 40% and 950 parts of hydrochloric acid of 15%, is mixed while cooling with 1420 parts of a warm (about 60° C.) solution, containing 25% of para-chlorobenzene sulfonate of sodium. Then the separated diazosalt is filtered at a low temperature and dried. It is an almost colorless and well soluble powder, having probably the formula:

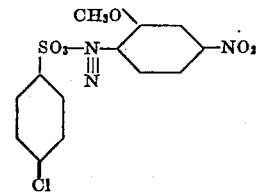

The same good result is obtained when starting from other unsulfonated amines of the benzene series, containing at least one negative substituent other than a sulfonic group.

The following table gives some other solid diazosalts obtainable according to our invention, derived from the following bases:

| Base. | Color of the dried para-chlorobenzene sulfonic diazosalt. |
|---|---|
| 3-nitranilin | Pale yellowish. |
| 2,4-dinitranilin | Dto. |
| 4-chloro-2-nitranilin | Pale brownish. |
| 2,5-dichloroanilin | Brownish. |
| 4-nitro-2-amino-1-anisol | Dto. |
| 2-nitro-4-amino-1-anisol | Pale yellowish. |
| 4-nitro-2-amino-1-toluene | Dto. |
| 5-nitro-2-amino-1-toluene | Pale brownish. |
| 3-nitro-4-amino-1-toluene | Brownish turning to violetish black when exposed to light. |
| 4-chloro-2-amino-1-toluene | Almost white turning to brownish when exposed to light. |
| 5-chloro-2-amino-1-toluene | Dto. |
| 6-chloro-2-amino-1-toluene | Dto. |

We claim:

1. As new products solid diazosalts of the general formula:

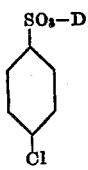

wherein D represents the diazonium radicle of a substituted, unsolfonated amine of the benzene series, containing at least one negative substituent other than a sulfonic group, being whitish to yellowish to brownish colored and soluble powders and being substantially identical with compounds obtainable by double decomposition reaction of mineral acid diazosalt solution of such amines either with a para-chlorobenzene sulfonic metal salt or with free para-chlorobenzene sulfonic acid.

2. As new products solid diazosalts of the general formula:

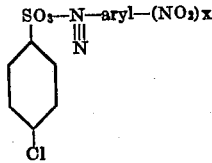

wherein aryl represents a residue of the benzene series which may be further substituted and X is 1 or 2, being whitish to yellowish to brownish colored and soluble powders and being substantially identical with compounds obtainable by double decomposition reaction of mineral acid diazosalt solution of arylamines, containing at least one nitrogroup, either with a para-chlorobenzene sulfonic metal salt or with free para-chlorobenzene sulfonic acid.

3. As new products solid diazosalts of the general formula:

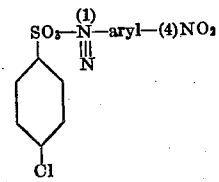

wherein aryl represents a residue of the benzene series which may be further substituted being whitish to yellowish to brownish colored and soluble powders and being substantially identical with compounds obtainable by double decomposition reaction of mineral acid diazosalt solution of para-nitroarylamines, either with a para-chlorobenzene sulfonic metal salt or with free para-chlorobenzene sulfonic acid.

4. As a new product the solid diazosalt of the formula:

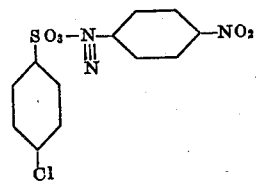

being an almost colorless and well soluble powder and being substantially identical with a compound obtainable by double decomposition reaction of mineral acid diazosalt solution of para-nitraniline either with a para-chlorobenzene sulfonic metal salt or with free para-chlorobenzene sulfonic acid.

In testimony whereof, we affix our signatures.

FERDINAND KELLER.
KARL SCHNITZSPAHN.